United States Patent
Curran et al.

(10) Patent No.: US 12,486,709 B2
(45) Date of Patent: Dec. 2, 2025

(54) ACTUATOR MECHANISM

(71) Applicant: Rivian IP Holdings, LLC, Plymouth, MI (US)

(72) Inventors: Spencer Charles Curran, Dana Point, CA (US); Kosta Papanikolaou, Corona, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 481 days.

(21) Appl. No.: 17/938,801

(22) Filed: Oct. 7, 2022

(65) Prior Publication Data

US 2024/0117665 A1    Apr. 11, 2024

(51) Int. Cl.
    *E05F 15/622*      (2015.01)
    *B60K 15/05*       (2006.01)

(52) U.S. Cl.
    CPC ............ *E05F 15/622* (2015.01); *B60K 15/05* (2013.01); *B60K 2015/0515* (2013.01); *E05Y 2201/604* (2013.01); *E05Y 2201/638* (2013.01); *E05Y 2900/534* (2013.01)

(58) Field of Classification Search
    CPC .................. E05F 15/622; B60K 15/05; B60K 2015/0515; E05Y 2201/604; E05Y 2201/638; E05Y 2900/534

USPC ............................................... 16/71
See application file for complete search history.

(56) References Cited

U.S. PATENT DOCUMENTS

| | | | |
|---|---|---|---|
| 3,952,605 A * | 4/1976 | Little ................. | E05B 47/026 70/101 |
| 2022/0381537 A1 * | 12/2022 | Green ................. | G02B 7/021 |

FOREIGN PATENT DOCUMENTS

| | | | | |
|---|---|---|---|---|
| CN | 214498706 U | * | 10/2021 | ............ E05B 81/06 |
| WO | WO-2022017813 A1 | * | 1/2022 | ............ B60K 15/05 |

* cited by examiner

*Primary Examiner* — Logan M Kraft
(74) *Attorney, Agent, or Firm* — Foley & Lardner LLP (57) ABSTRACT

An apparatus can include a housing. The housing can define a cavity. The housing can include a barrel cam profile. The apparatus can include an anchor. The anchor can be at least partially disposed within the cavity. The anchor can move between a first position and a second position. The apparatus can include a drive body. The drive body can be disposed within the cavity. The apparatus can include a spring. The spring can be at least partially disposed between the anchor and the drive body. The apparatus can include a shaft to interface with the drive body. The shaft can translate the anchor. The spring of the barrel cam profile can rotate the anchor between the first position and the second position.

18 Claims, 9 Drawing Sheets

ACTUATOR MECHANISM

INTRODUCTION

Vehicles or other machines can include motors that can provide power to move objects. Objects can be moved to different positions.

SUMMARY

Movement of an object can include both translational and rotational movement. Providing translational and rotational movement can require higher power actuators and can create friction and damage to the system. The technical solution described herein provides an actuator that can include a single-sided barrel cam profile and a spring to create the rotational movement. For example, rotation of an anchor in a first direction can be created by a torsion spring applying a torque to the anchor, and rotation of the anchor in a second direction can be created by a pin of the actuator following the single-sided barrel cam profile. Using a spring to create rotational movement can reduce the amount of stress felt by the system, which can reduce the wear and tear on the components of the system and simplify and decrease the cost of manufacturing.

At least one aspect is directed to an apparatus. The apparatus can include a housing. The housing can define a cavity. The housing can include a barrel cam profile. The apparatus can include an anchor. The anchor can be at least partially disposed within the cavity. The anchor can move between a first position and a second position. The apparatus can include a drive body. The drive body can be disposed within the cavity. The apparatus can include a spring. The spring can be at least partially disposed between the anchor and the drive body. The apparatus can include a shaft to interface with the drive body. The shaft can translate the anchor and at least one of the spring and the barrel cam profile can rotate the anchor between the first position and the second position.

At least one aspect is directed to a method. The method can include activating an actuator. The actuator can include a housing. The housing can define a cavity. The housing can have a barrel cam profile. The actuator can include an anchor. The anchor can be at least partially disposed in the cavity. The actuator can include a drive body. The drive body can be disposed in the cavity. The actuator can include a spring disposed. The spring can be between the anchor and the drive body. The actuator can include a shaft. The shaft can interface with the drive body. The method can include moving the anchor from a first position to a second position. Moving the anchor can include translating the anchor within the cavity via the shaft. Moving the anchor can include rotating the anchor within the cavity via at least one of the spring and the barrel cam profile.

At least one aspect is directed to an electric vehicle. The electric vehicle can include an actuator. The actuator can be coupled with a vehicle component. The actuator can include a housing. The housing can define a cavity. The housing can include a barrel cam profile. The actuator can include an anchor. The anchor can be at least partially disposed within the cavity. The anchor can move between a first position and a second position. The actuator can include a drive body. The drive body can be disposed within the cavity. The actuator can include a spring. The spring can be at least partially disposed between the anchor and the drive body. The actuator can include a shaft. The shaft can interface with the drive body. The shaft can translate the anchor and at least one of the spring and the barrel cam profile can rotate the anchor as the anchor moves between the first position and the second position. The actuator can move the vehicle component between a first element position and a second element position.

At least one aspect is directed to a method. The method can include providing an actuator. The actuator can include a housing. The housing can define a cavity. The housing can include a barrel cam profile. The actuator can include an anchor. The anchor can be at least partially disposed within the cavity. The anchor can move between a first position and a second position. The actuator can include a drive body. The drive body can be disposed within the cavity. The actuator can include a spring. The spring can be at least partially disposed between the anchor and the drive body. The actuator can include a shaft. The shaft can interface with the drive body. The shaft can translate the anchor and at least one of the spring and the barrel cam profile can rotate the anchor to move the anchor between the first position and the second position.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of translating and rotating an anchor via a barrel cam profile and a spring. The various concepts introduced above and discussed in greater detail below may be implemented in any of numerous ways.

The present disclosure is directed to systems and methods for using an actuator to drive translational and rotational movement such that some of the rotational movement is created by a barrel cam profile and some of the rotational movement is created by a spring (e.g., a torsion spring). The disclosed solutions can have a technical advantage of providing translational and rotational movement that requires less power, reduces the wear and tear on the components of the system, and allows the system to function in environments with different clearances.

The disclosed solution can include an actuator. The actuator can cause an anchor to translate and rotate, wherein some of the translational movement can be performed independent of the rotational movement. The independent translational movement allows the actuator to accommodate different tolerances and avoid obstacles. The actuator can include a housing that contains a shaft, a drive body, a spring, and an anchor. The actuator can move the anchor between a first (e.g., closed) position and a second (e.g., open) position. To move from the first position to the second position, the shaft can translate the anchor and the spring can rotate the anchor. For example, the housing can include a slot and a barrel cam profile and the anchor can have a pin that slides along the slot and the barrel cam profile. The shaft can translate the anchor such that the pin moves along the slot, and then as the slot reaches the barrel cam profile, the shaft can continue to translate the anchor as the spring causes the anchor to rotate such that the pin slides along the barrel cam profile. To move from the second position to the first position, the shaft can translate the anchor in an opposite direction such that the pin slides along the barrel cam profile in an opposite direction. The barrel cam can force the anchor to rotate in an opposite direction. Rotating the anchor in the opposite direction can increase a tension in the spring. The anchor can continue to rotate until the pin is disposed back in the slot.

The disclosed solutions have a technical advantage of reducing the power needed to create the translational and rotational movement. Instead of needing a higher power actuator to rotate the anchor, less power can be used for the translational movement while the barrel cam profile and the spring can create the rotational movement. Additionally, the disclosed solutions have a technical advantage of reducing the wear and tear on the system. At least some of the rotational movement can be generated by the spring, which can reduce the force and stress applied to a pin of the anchor. This can also provide the advantage of simplifying manufacturing of the system. For example, the system can eliminate the need for a high-cost ceramic coating on the pin since less force can be applied to the pin.

The disclosed solutions also have the technical advantage of being compatible with various environments and accommodating various clearances. For example, the system can create translational movement separate from any rotational movement to position the anchor such that the anchor can avoid hitting an obstacle when the anchor begins to rotate. A distance of the separate translational movement can vary based on the environment.

Figure 1:
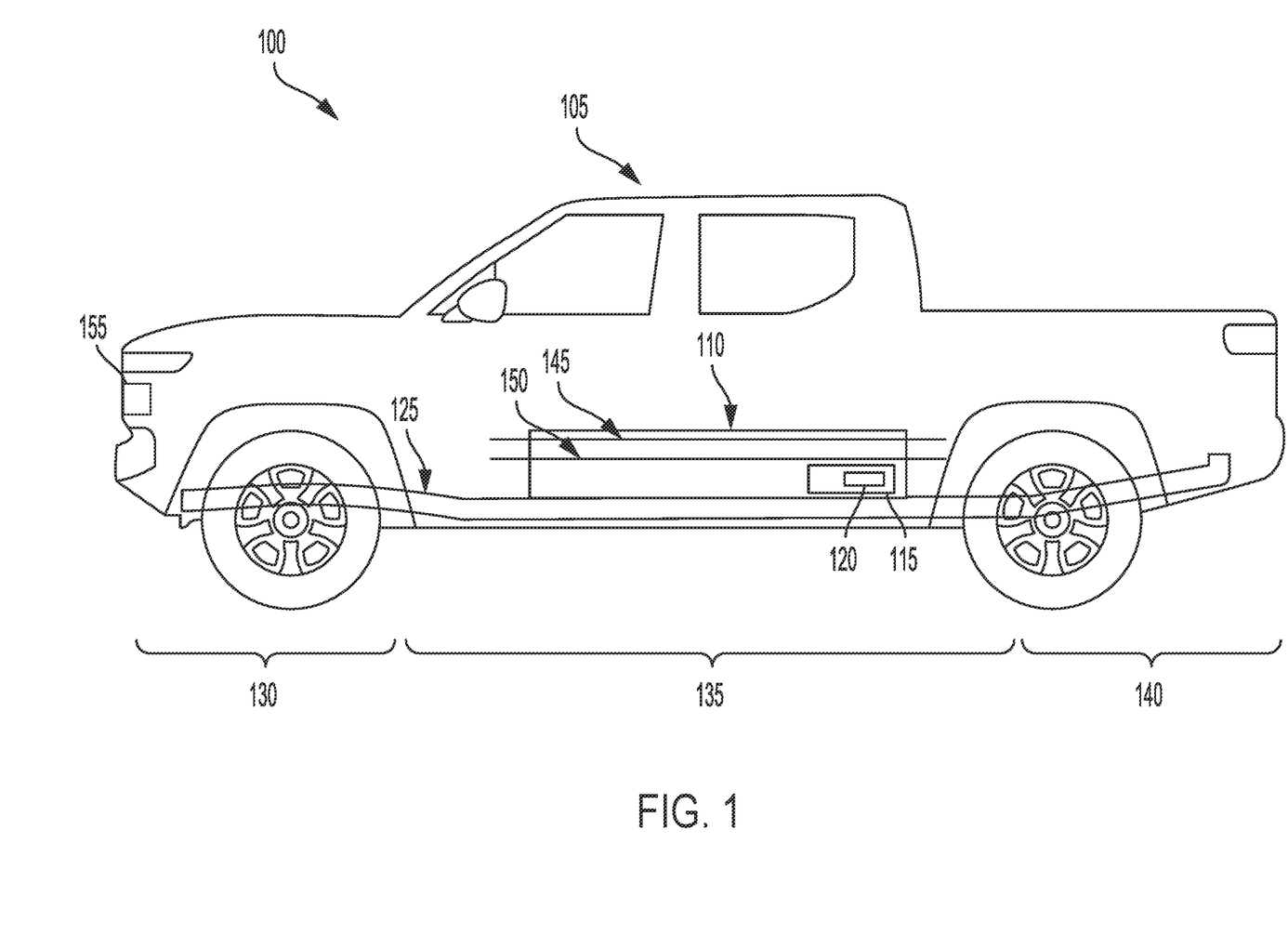
FIG. 1 depicts a cross-sectional view of an electric vehicle, in accordance with some aspects.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Electric vehicles 105 can include at least one vehicle component 155. The vehicle component 155 can be any feature of the electric vehicle 105 that can move between a first position and a second position. For example, the vehicle component can be a charge port door. The charge port door can move between a first position (e.g., a closed position) and a second position (e.g., an open position). The vehicle component 155 can be an external or internal component (e.g., a vehicle panel, glove box door).

Figure 2:
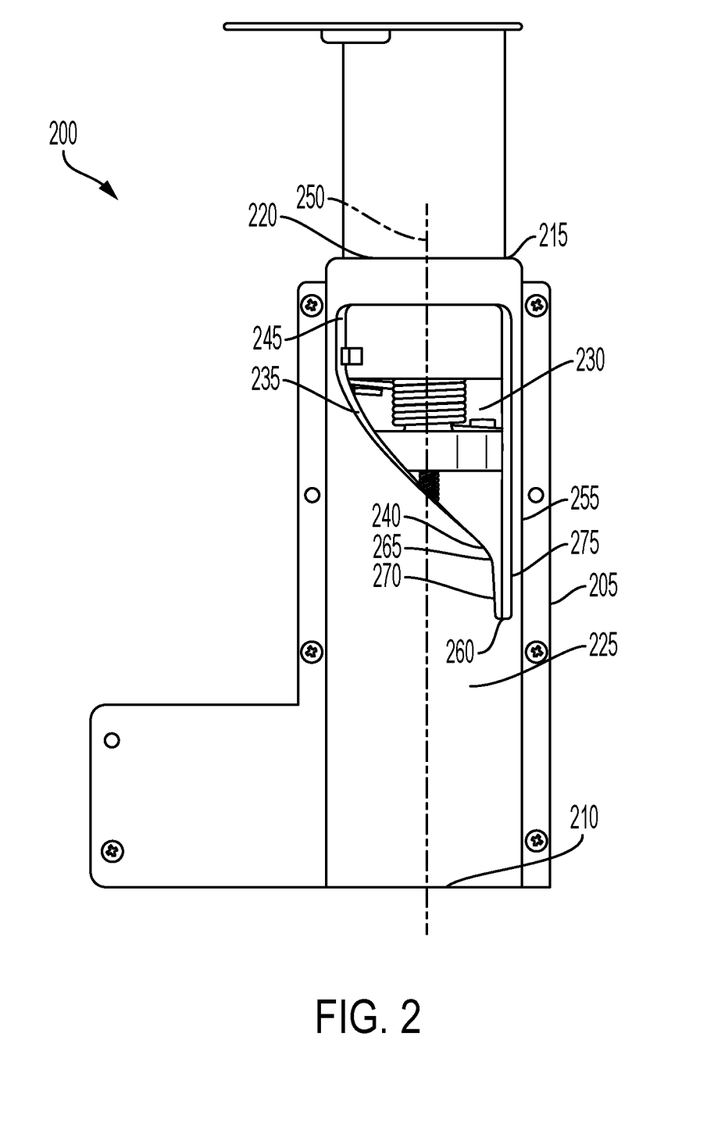
FIG. 2 depicts a front view of an example apparatus, in accordance with some aspects.

FIG. 2 depicts a front view of an example apparatus, shown as actuator 200. The actuator 200 can include a housing 205. The housing 205 can have a first housing end 210 and a second housing end 215. The first housing end 210 can be enclosed and the second housing end 215 can define an opening 220. The housing 205 can include at least one sidewall 225 that extends between the first housing end 210 and the second housing end 215. The sidewall 225 can have any shape. For example, the sidewall 225 can have a cylindrical shape. The housing 205 can define a cavity 230. The cavity 230 can receive at least one component of the actuator 200. The opening 220 can provide access to the cavity 230. The cavity 230 can extend, at least partially, between the first housing end 210 and the second housing end 215.

The housing 205 can have a barrel cam profile 235. The barrel cam profile 235 can be defined by a recess in an interior of the sidewall 225 or by a projection that extends from the interior of the sidewall 225 into the cavity 230. The barrel cam profile 235 can extend through the sidewall 225. The barrel cam profile 235 can define a path to facilitate translational and rotational movement of a component of the actuator 200. For example, an angle or slope of the barrel cam profile 235 can establish a rate of rotation relative to a rate of translation of the component. For example, a barrel cam profile 235 with a steeper slope can facilitate a lower rate of rotation than a barrel cam profile 235 with a more gradual slope. The barrel cam profile 235 can have a first profile end 240 and a second profile end 245. The first profile end 240 can be closer to the first housing end 210 than the second profile end 245. Between the first profile end 240 and the second profile end 245, the barrel cam profile 235 can have a continuous surface (e.g., no sharp corners) to facilitate smooth movement of the component of the actuator 200 between a first position and a second position. The barrel cam profile 235 can have any shape. For example, the barrel cam profile 235 can be straight, convex, concave, or any other shape or combination of shapes (e.g., convex and concave). The barrel cam profile 235 can be a single-sided barrel cam profile 235. For example, the housing 205 can have no additional profile that opposes the barrel cam profile 235 and has the same shape as the barrel cam profile 235.

The second profile end 245 can be disposed at any location away from the first profile end 240. For example, the second profile end 245 can be disposed at a location that is longitudinally offset from the first profile end 240. For example, the housing 205 can have a longitudinal axis 250. The longitudinal axis 250 can extend along a center of the cavity 230 along a length of the housing 205. The second profile end 245 can be disposed at a location such that a straight barrel cam profile 235 is not parallel with the longitudinal axis 250. For example, the barrel cam profile 235 can have a 45 degree angle with respect to the longitudinal axis 250. The angle of the barrel cam profile 235 from the longitudinal axis 250 can be more or less than 45 degrees.

The housing 205 can have a slot 255. The slot 255 can be defined by a recess in the interior of the sidewall 225 or by a projection that extends from the interior of the sidewall into the cavity 230. The slot 255 can extend through the sidewall 225. The slot 255 can have a first slot end 260 and a second slot end 265. The first slot end 260 can be closer to the first housing end 210 than the second slot end 265. The slot 255 can extend along a length of the housing 205. For example, the slot 255 can extend substantially parallel (e.g., +/−10%) with the longitudinal axis 250. The second slot end 265 can transition into the barrel cam profile 235. For example, the slot 255 can have a first slot wall 270 and a second slot wall 275. At least one of the first slot wall 270 and the second slot wall 275 can bend at the second slot end 265 and transition into the first profile end 240 of the barrel cam profile 235. For example, the first slot wall 270 can bend and transition into the barrel cam profile 235 and the second slot wall 275 can either end, continue straight, follow the same profile as the barrel cam profile 235, or continue in a different direction.

The housing 205 can be made of any material capable of maintaining a shape and housing other components. For example, the housing 205 can be made of a hard plastic or metal, among other materials. The housing 205 can comprise a single piece or can comprises a plurality of pieces that are coupled together. For example, the housing 205 can have a first portion (e.g., a front portion) and a second portion (e.g., a rear portion) that are coupled together to form the cavity 230. The first portion and the second portion can be coupled together via any coupling mechanism including, but not limited to, mechanical fasteners (e.g., screws, bolts), adhesives, soldering, welding, or melting.

Figure 3:
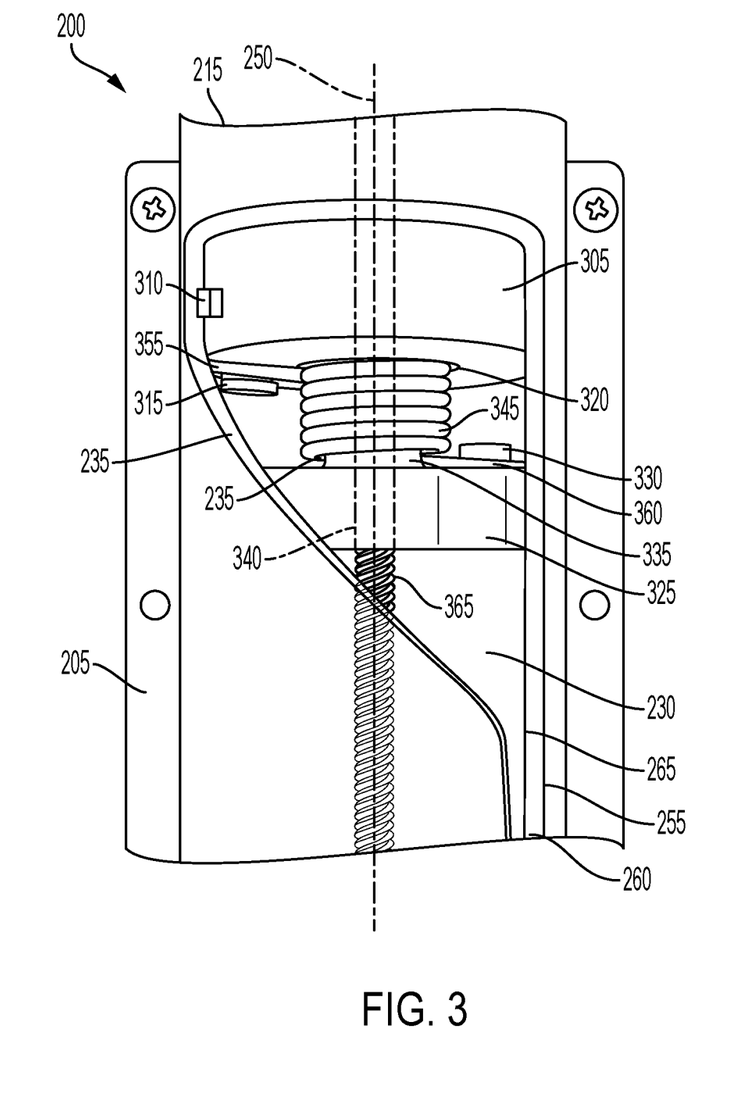
FIG. 3 depicts a detailed front view of an example apparatus, in accordance with some aspects.

FIG. 3 depicts a detail view of example actuator 200. The actuator 200 can include at least one anchor 305. The anchor 305 can be at least partially disposed within the cavity 230. The anchor 305 can move between a first position and a second position. For example, the anchor 305 can translate in the cavity 230 along the longitudinal axis 250 between the first housing end 210 and the second housing end 215. The anchor 305 can rotate in the cavity 230 around the longitudinal axis 250. The anchor 305 can have at least one pin 310. The pin 310 can extend from the anchor 305. The pin 310 can slide along the barrel cam profile 235 and the slot 255 as the anchor 305 moves between the first position and the second position. For example, with the anchor 305 in the first position, the pin 310 can be disposed at the first slot end 260. The anchor 305 can translate toward the second housing end 215 and the pin 310 can slide in the slot 255 from the first slot end 260 to the second slot end 265. The second slot end 265 can transition into the barrel cam profile 235 and the pin 310 can slide from the slot 255 along the barrel cam profile 235. The anchor 305 can translate toward the second housing end 215 and rotate within the cavity 230 and the pin 310 can slide from the first profile end 240 to the second profile end 245. The anchor 305 can be in the second position with the pin 310 disposed at the second profile end 245 of the barrel cam profile 235. The pin 310 can move along the slot 255 and the barrel cam profile 235 in a first direction as the anchor 305 moves from the first position to the second position and the pin can move along the slot 255 and the barrel cam profile 235 in a second direction as the anchor 305 moves from the second position to the first position. The barrel cam profile 235 can facilitate rotation of the anchor 305 and the slot 255 can prevent rotation of the anchor 305. The housing 205 can also include a barrel cam profile 235 without a slot 255, such that the pin 310 only slides along the barrel cam profile 235 as the anchor 305 moves between the first and second positions.

The anchor 305 can include at least one anchor contact surface 315. The anchor contact surface 315 can be a projection extending from the anchor 305. The anchor contact surface 315 can be defined by a recess in the anchor 305. The anchor contact surface 315 can facilitate rotation of the anchor 305 within the cavity 230. For example, a force can be applied to the anchor contact surface 315 to cause the anchor 305 to rotate.

The anchor 305 can define at least one anchor cavity 320. The anchor cavity 320 can extend through at least a portion of the anchor 305. The anchor cavity 320 can be disposed centrally within the anchor 305. The anchor cavity 320 can facilitate translation of the anchor within the cavity 230. For example, the anchor cavity 320 can receive at least one other component of the actuator 200 that can cause a force to be applied to the anchor 305 and cause the anchor 305 to translate.

The actuator 200 can include at least one drive body 325. The drive body 325 can be disposed in the cavity 230. The drive body 325 can be disposed closer to the first housing end 210 than the anchor 305. The drive body 325 can move between a first position and a second position within the cavity 230. For example, the drive body 325 can translate along the longitudinal axis 250 of the housing 205 between the first position and the second position. The drive body 325 can have a shape that prevents the drive body 325 from rotating within the cavity 230. The drive body 325 can include at least one drive body contact surface 330. The drive body contact surface 330 can be a projection extending from the drive body 325. The drive body contact surface 330 can be defined by a recess in the drive body 325. The drive body contact surface 330 can facilitate rotation of the anchor 305. For example, the drive body contact surface 330 can cause a force to be applied to the anchor contact surface 315 and cause the anchor 305 to rotate. The drive body contact surface 330 and the anchor contact surface 315 can work together to facilitate the rotation of the anchor 305.

The drive body 325 can be coupled with the anchor 305. For example, the drive body 325 can include a boss 335. The boss 335 can extend from the drive body 325 toward the anchor 305. The boss 335 can extend from a center of the drive body 325. At least a portion of the boss 335 can extend into the anchor cavity 320. The boss 335 can couple the drive body 325 with the anchor 305. For example, the boss 335 can couple with the anchor 305 such that translation of the drive body 325 can cause translation of the anchor 305. The boss 335 can couple with the anchor 305 such that the anchor 305 can rotate relative to the drive body 325. For example, the anchor 305 can rotate as the drive body 325 does not rotate.

The drive body 325 can include a body aperture 340. The body aperture 340 can extend, at least partially, through the drive body 325 and the boss 335. The body aperture 340 can receive at least one other component of the actuator 200. For example, a portion of the body aperture 340 can have a threaded profile. The portion of the body aperture 340 can interact with a threaded component of the actuator 200.

The actuator 200 can include at least one spring 345. The spring 345 can be disposed, at least partially, between the anchor 305 and the drive body 325. The spring 345 can facilitate rotation of the anchor 305. For example, the spring 345 can apply a force to the anchor contact surface 315 to cause the anchor 305 to rotate. The spring 345 can be a torsion spring. For example, the spring 345 can define a central aperture 350. The boss 335 of the drive body 325 can extend through the central aperture 350. The spring 345 can have a first spring arm 355 and a second spring arm 360. In a natural state (e.g., no forces being applied to the spring 345), the first spring arm 355 can extend in a first arm direction and the second spring arm 360 can extend in a second arm direction. The first arm direction can be different than the second arm direction, defining an angle between the first spring arm 355 and the second spring arm 360. The first spring arm 355 can interface with a first contact surface (e.g., the anchor contact surface 315). The second spring arm 360 can interface with a second contact surface (e.g., the drive body contact surface 330). In an unnatural state (e.g., a force is applied to the spring 345), the spring 345 can apply a force to both the anchor contact surface 315 and the drive body contact surface 330. Since the drive body 325 cannot rotate, the force applied to the anchor contact surface 315 can cause the anchor 305 to rotate. The spring 345 in an unnatural state can bias the anchor 305 to a position such that the spring 345 returns to its natural state, or at least closer to its natural state.

The actuator 200 can include at least one shaft 365. The shaft 365 can be disposed, at least partially, in the cavity 230. The shaft 365 can extend along the longitudinal axis 250 between the first housing end 210 and the second housing end 215. The shaft 365 can extend beyond the second housing end 215. The shaft 365 can facilitate translation of the anchor 305. For example, the shaft 365 can interface with the drive body 325 and cause the drive body 325 to translate, which can cause the anchor 305 to translate. For example, the shaft 365 can contact a surface of the drive body 325 and push or pull the drive body 325. Pushing the drive body 325 can cause the anchor 305 to move in a first translational direction and pulling the drive body 325 can cause the anchor 305 to move in a second translational direction (e.g., opposite the first direction). The shaft 365 can be a lead screw. The lead screw shaft 365 can extend through the body aperture 340 of the drive body 325 and interact with the threaded portion of the body aperture 340. The lead screw shaft 365 can rotate and the drive body 325 can translate along the shaft 365 as the shaft 365 rotates. Translation of the drive body 325 can cause translation of the anchor 305. Rotation of the shaft 365 in a first rotational direction can cause translation of the anchor 305 in the first translational direction and rotation of the shaft 365 in a second rotational direction can cause translation of the anchor 305 in the second translational direction.

Figure 4:
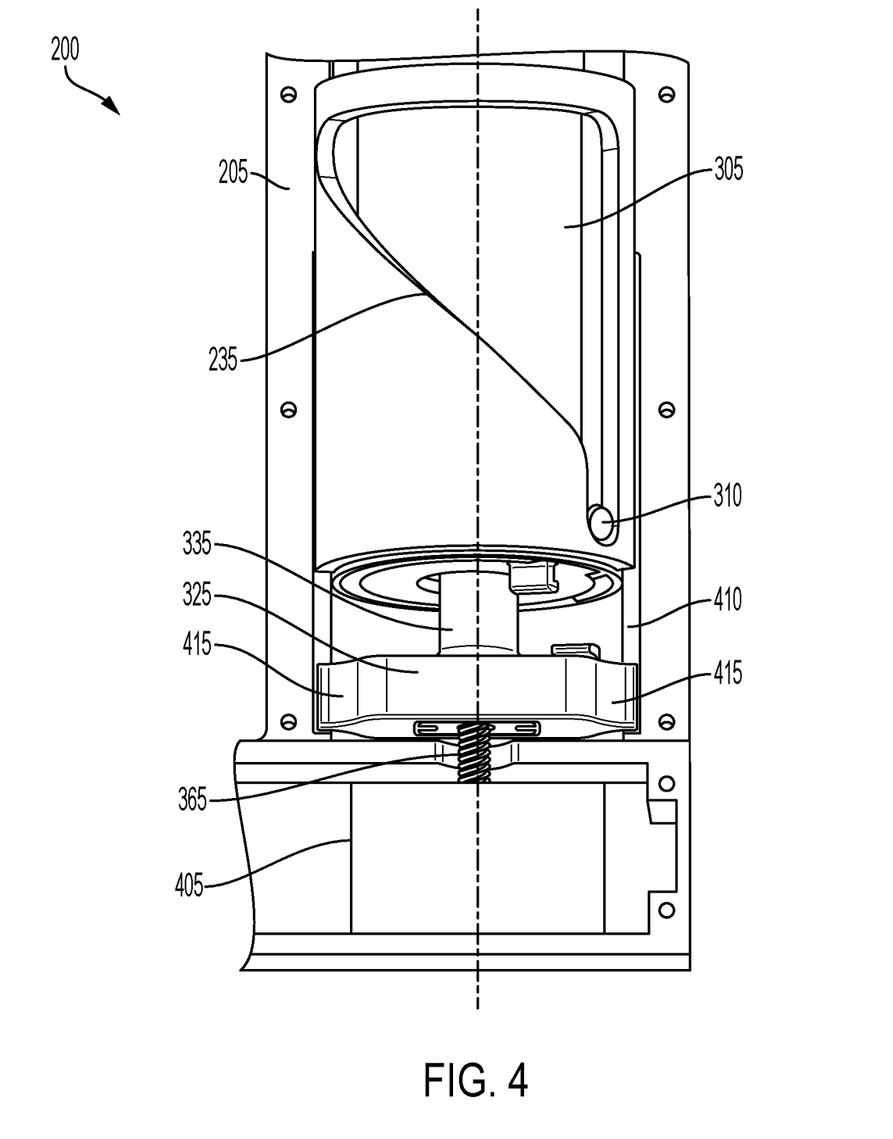
FIG. 4 depicts a front view of an example apparatus, in accordance with some aspects.

FIG. 4 depicts an internal view of example actuator 200. The actuator 200 can include an activator 405. The activator 405 can be disposed at a first housing end 210. The drive body 325 can be disposed between the activator 405 and the anchor 305. The activator 405 can be coupled to the shaft 365. The activator 405 can cause the shaft 365 to move, to move the anchor 305 between the first position and the second position. For example, the activator 405 can be or include at least one of a linear activator 405 and a rotational activator (e.g., a motor). The linear activator can extend the shaft 365 to push the drive body 325 such that the anchor 305 translates in a first translational direction (e.g., toward the second housing end 215). The linear activator 405 can retract the shaft 365 to pull the drive body 325 such that the anchor 305 translates in a second translational direction (e.g., toward the first housing end 210). The activator 405 can be a rotational activator 405. For example, the activator 405 can rotate a lead screw shaft 365 (e.g., via a motor) in a first rotational direction to cause the drive body 325 to translate along the shaft 365 in the first translational direction. The anchor 305 can translate with the drive body 325 along the shaft 365 in the first translational direction. The activator 405 can rotate the lead screw shaft 365 in a second rotational direction to cause the drive body 325 to translate along the shaft 365 in the second translational direction. The anchor 305 can translate with the drive body 325 along the shaft 365 in the second translational direction.

The drive body 325 can have a shape that prevents the drive body 325 from rotating in the cavity 230. For example, the housing 205 can define at least one channel 410. The channel 410 can extend along an inner wall of the housing 205. The channel 410 can extend parallel with the longitudinal axis 250 of the housing 205. The drive body 325 can have at least one tip 415. The tip 415 can be disposed in the channel 410 such that the drive body 325 cannot rotate within the cavity 230. The drive body 325 can have a plurality of tips 415. For example, the housing 205 can have a first channel 410 disposed at a first location within the housing 205 and a second channel 410 disposed at a second location within the housing 205. The first location can be opposite the second location. The drive body 325 can have a first tip 415 to be disposed in the first channel 410 and a second tip 415 to be disposed in the second channel 410.

Figure 5:
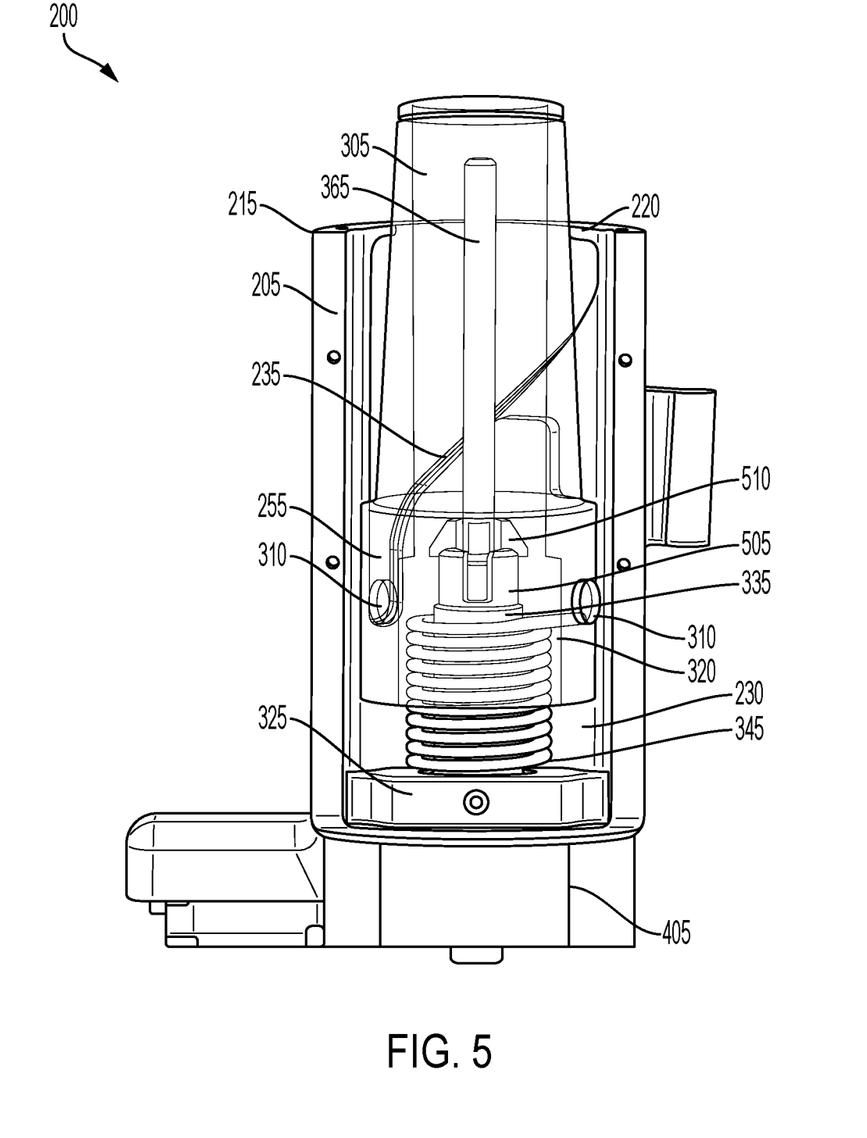
FIG. 5 depicts a front view of an example apparatus, in accordance with some aspects.

FIG. 5 depicts an internal view of example actuator 200. The anchor 305 can be partially disposed in the cavity 230. The anchor 305 can extend out of the housing 205 through the opening 220 at the second housing end 215. The shaft 365 can extend from the activator 405 though the body aperture 340, which can extend through the drive body 325 and the boss 335, along the anchor cavity 320 to a point beyond the second housing end 215. The spring 345 can be disposed at least partially between the drive body 325 and the anchor 305. For example, the anchor cavity 320 can have a portion that is large enough to receive a portion of the spring 345 such that a portion of the spring 345 is disposed in the anchor cavity 320.

The boss 335 of the drive body 325 can have a connection tip 505. The connection tip 505 can couple the drive body 325 with the anchor 305. For example, the connection tip 505 can couple the drive body 325 with the anchor 305 such that the anchor 305 can translate with the drive body 325 and the anchor 305 can rotate relative to the drive body 325. The connection tip 505 can have at least one flange 510 to couple the boss 335 with the anchor 305. For example, the flange 510 can interface with a surface defining the anchor cavity 320. The flange 510 can facilitate translational movement between the drive body 325 and the anchor 305 and allow rotational movement of the anchor 305 with respect to the drive body 325.

Figure 6:
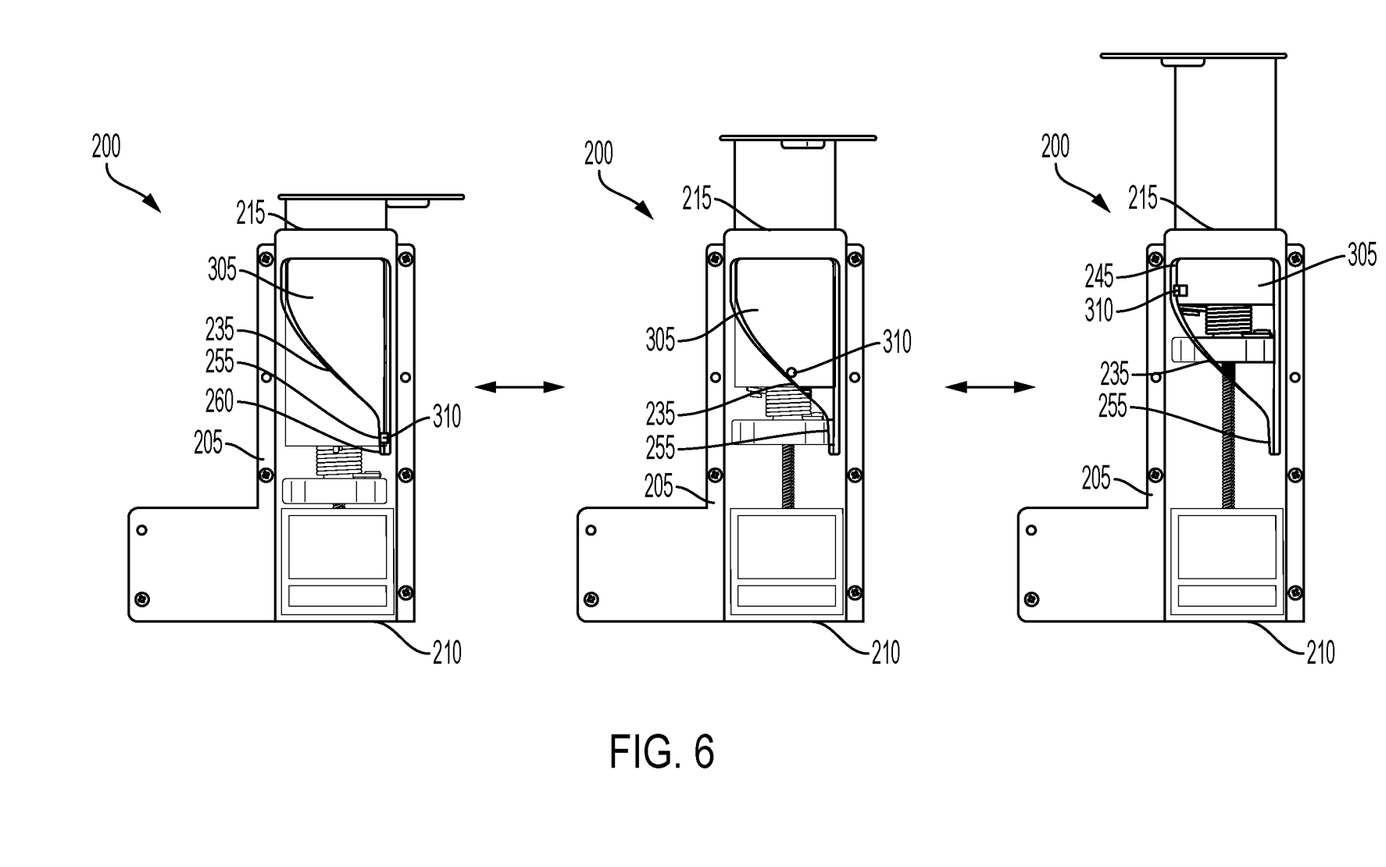
FIG. 6 depicts front views of an example apparatus, in accordance with some aspects.

FIG. 6 depicts front views of example actuator 200. The actuator 200 can move the anchor 305 between a first position and a second position. The first position can include the pin 310 of the anchor 305 being disposed at the first slot end 260 of the slot 255. The second position can include the pin 310 being disposed at the second profile end 245 of the barrel cam profile 235. The anchor 305 can be in any number of intermediate positions with the pin 310 disposed along the slot 255 and the barrel cam profile 235 between the first slot end 260 and the second profile end 245. The anchor 305 can translate and rotate within the cavity 230 of the housing 205 of the actuator 200 to move between the first position and the second position. The pin 310 of the anchor 305 can be disposed at a first slot end 260 with the anchor 305 in the first position. The anchor 305 can translate within the cavity 230 as the pin 310 moves along the slot 255 between the first slot end 260 and the second slot end 265. A length of the slot 255 can be based, at least partially, on a clearance needed to rotate the anchor 305. For example, the anchor 305 may need to translate a predefined distance before beginning to rotate to avoid hitting an external element. The anchor 305 can translate and rotate as the pin 310 moves along the barrel cam profile 235 between the first profile end 240 and the second profile end 245.

The shaft 365 can translate the anchor 305 between the first position and the second position. The shaft 365 can extend, retract, or rotate, among other movements, such that the anchor 305 can translate along the cavity 230 of the housing 205. For example, with a linear activator 405, extending the shaft 365 can push the drive body 325 such that the anchor 305 translates in a first translational direction (e.g., toward the second housing end 215). Retracting the shaft 365 can pull the drive body 325 such that the anchor 305 translates in a second translational direction (e.g., toward the first housing end 210). With a rotation activator 405 (e.g., a motor), the shaft 365 can be a lead screw that can interact with the threaded profile of the body aperture 340 of the drive body 325 such that rotation of the shaft 365 in a first rotational direction can cause the drive body 325, and therefore the anchor 305, to translate in the first translational direction. Rotation of the shaft 365 in a second rotational direction can cause the drive body 325, and therefore the anchor 305, to translate in the second translational direction.

At least one of the spring 345 and the barrel cam profile 235 can rotate the anchor between the first position and the second position. The anchor 305 can rotate in a first rotational direction. Rotation in the first rotational direction can cause a first contact surface (e.g., the anchor contact surface 315) to move away from a second contact surface (e.g., the drive body contact surface 330). The first contact surface moving away from the second contact surface can decrease a tension in the spring 345. The anchor 305 can rotate in a second rotational direction. Rotation in the second rotational direction can cause the first contact surface to move toward the second contact surface. The first contact surface moving toward the second contact surface can increase the tension in the spring 345. The spring 345 can be configured such that moving the first contact surface away from the second contact surface can increase a tension in the spring 345 and moving the first contact surface toward the second contact surface can decrease the tension in the spring 345.

The spring 345 can rotate the anchor 305 as the anchor moves from the first position to the second position. For example, with the anchor 305 in the first position, the spring 345 can be in an unnatural (e.g., compressed) state. The unnatural state can include a force being applied to the spring 345 such that the anchor contact surface 315 is pushed closer to the drive body contact surface 330. This force creates a tension in the spring 345 that biases the anchor 305 to rotate in the first rotational direction to the second position. With the pin 310 in the slot 255, the slot can prevent the spring 345 from rotating the anchor 305 to the second position. An angle between the anchor contact surface 315 and the drive body contact surface 330 with the spring 345 in the unnatural state can be less than the angle with the spring 345 in the natural state. As the pin 310 exits the second slot end 265, the spring 345 can begin to return to the natural state, which can cause the pin 310 to follow the barrel cam profile 235. The pin 310 following the barrel cam profile 235 can cause the anchor 305 to rotate in the first rotational direction as the shaft 365 translates the anchor 305 toward the second housing end 215.

The barrel cam profile 235 can rotate the anchor 305 as the anchor moves from the second position to the first position. For example, as the shaft 365 causes the anchor 305 to translate in the second translational direction (e.g., toward the first housing end 210), the pin 310 of the anchor 305 can follow the barrel cam profile 235. The pin 310 following the barrel cam profile 235 can cause the anchor 305 to rotate in the second rotational direction. The barrel cam profile 235 can increase a tension in the spring 345. For example, as the shaft 264 translates the anchor 305 in the second translational direction and as the anchor 305 rotates in the second rotational direction, a tension in the spring 345 can build. For example, as the anchor 305 rotates in the second rotational direction, the anchor contact surface 315 can move closer to the drive body contact surface 330. Moving the contact surfaces 315, 330 closer together can cause the first spring arm 355 to move closer to the second spring arm 360, which can put the spring 345 in an unnatural state. The actuator 200 can move the anchor 305 between the first position and the second position any number of times. The actuator 200 can move the anchor 305 between any intermediate positions any number of times. For example, the anchor 305 cannot move the full distance between the first slot end 260 and the second profile end 245. The anchor 305 can move between a first intermediate position and a second intermediate position. The anchor 305 can move between an intermediate position and at least one of the first position and the second position.

Figure 7:
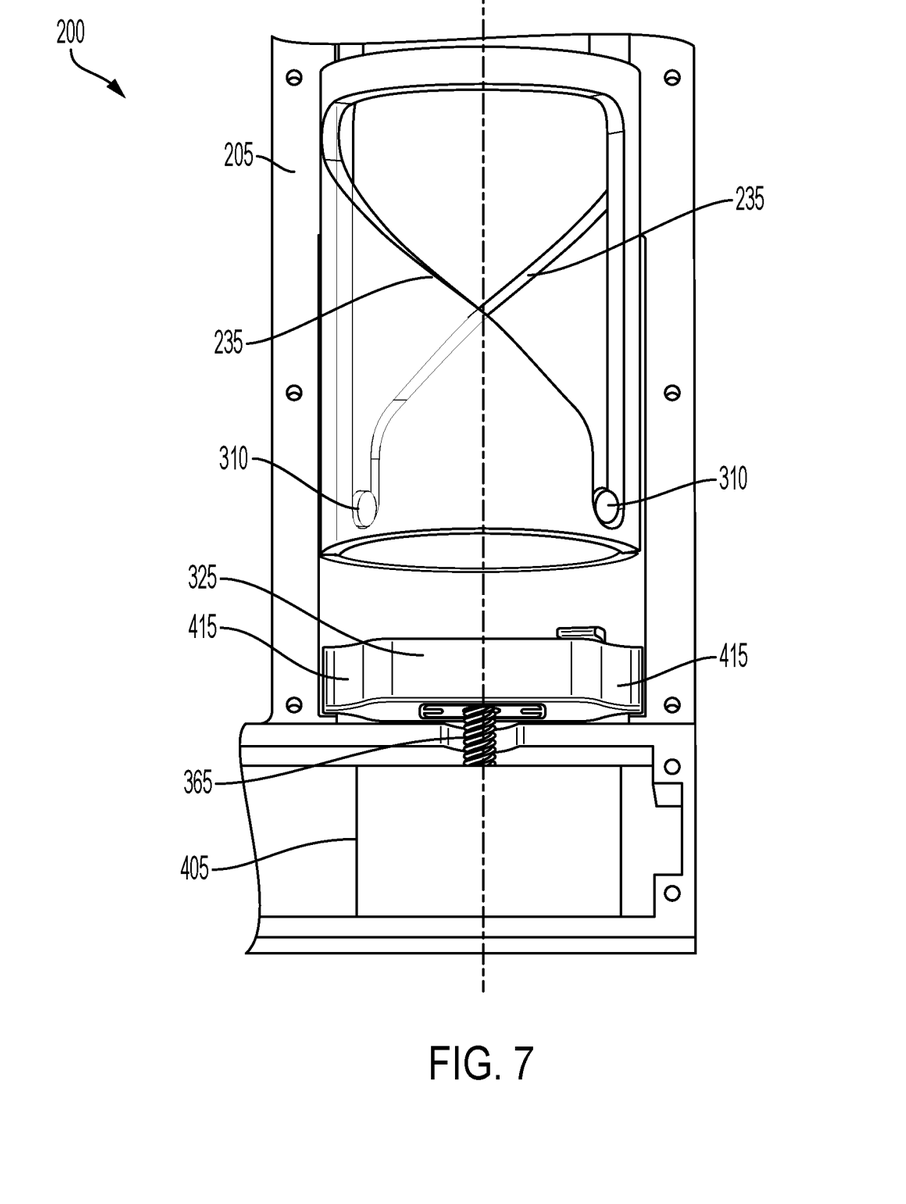
FIG. 7 depicts front views of an example apparatus, in accordance with some aspects.

FIG. 7 depicts a front view of example actuator 200. Actuator 200 can include a plurality of barrel cam profiles 235. For example, the actuator 200 can include a first barrel cam profile 235 and a second barrel cam profile 235. The first barrel cam profile 235 can be disposed on a front of the housing 205 and the second barrel cam profile 235 can be disposed on the back of the housing 205. The first barrel cam profile 235 can be disposed opposite the second barrel cam profile 235. The first barrel cam profile 235 can have the same shape as the second barrel cam profile 235. For example, from a front view, the first barrel cam profile 235 can appear to be a mirror image of the second barrel cam profile 235 flipped along the longitudinal axis 250. Each of the plurality of barrel cam profiles 235 can be a single-sided barrel cam profile 235.

The actuator 200 can include a plurality of slots 255. For example, the actuator 200 can include a first slot 255 and a second slot 255. The first slot 255 can be disposed on the first side of the housing 205 and the second slot 255 can be disposed on the second side of the housing 205. The first slot 255 can transition into the first barrel cam profile 235 and the second slot 255 can transition into the second barrel cam profile 235.

The anchor 305 of the actuator 200 can include a plurality of pins 310. For example, the anchor 305 can have a first pin 310 and a second pin 310. The first pin 310 can slide along the first slot 255 and the first barrel cam profile 235. The second pin 310 can slide along the second slot 255 and the second barrel cam profile 235. The first pin 310 can slide along the first slot 255 at the same time that the second pin 310 slides along the second slot 255. The first pin 310 can side along the first barrel cam profile 235 at the same time that the second pin 310 slides along the second barrel cam profile 235. The first pin 310 can slide along the first barrel cam profile 235 and the first slot 255 in the same direction that the second pin 310 slides along the second barrel cam profile 235 and the second slot 255. For example, if the first pin 310 is moving toward the second housing end 215, the second pin 310 can move toward the second housing end 215. If the first pin 310 is moving in a rotational direction (e.g., clockwise around the longitudinal axis 250), the second pin 310 can move in the same rotational direction. Having separate pins 310 slide along separate barrel cam profiles 235 and separate slots 255 can reduce the wear and tear on a single pin 310. For example, the force felt by a single pin 310 can be divided between the plurality of pins 310.

An electric vehicle 105 can include the actuator 200. For example, the anchor 305 can be coupled with a vehicle component 155 of electric vehicle 105. Movement of the anchor 305 between the first position and the second position can cause the vehicle component 155 to move between a first component position and a second component position. The vehicle component 155 can be a charge port door, or any other moveable component of the electric vehicle 105 (e.g., vehicle panels), such that the charge port door can move from the first component position (e.g., a closed position) to the second component position (e.g., an open position). A length of a slot 255 of the housing 205 can be based, at least partially, on a clearance needed for the vehicle component 155 to rotate between the first component position and the second component position. For example, the vehicle component 155 can translate a predetermined distance before the vehicle component 155 can rotate to avoid hitting an external element.

Figure 8:
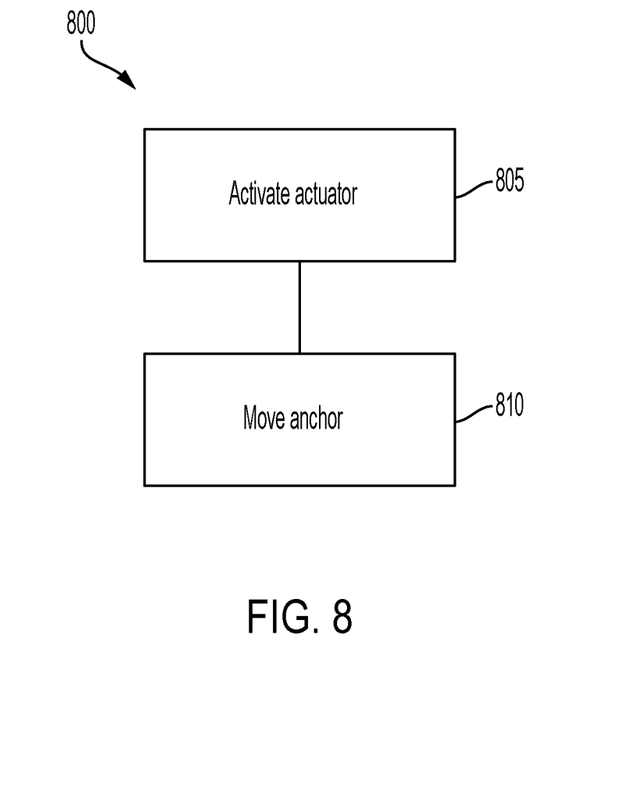
FIG. 8 depicts a flow diagram illustrating an example method to move an anchor of an apparatus, in accordance with some aspects.

FIG. 8 depicts an example method 800 to move an anchor 305. Method 800 can include activating an actuator (Act 805) and moving an anchor (Act 810). Act 805 of activating an actuator can include activating actuator 200. Activating the actuator 200 can include initiating or activating activator 405. Activating the activator 405 can include moving the shaft 365. For example, an activator 405 that is a linear actuator can extend or retract the shaft 365 within the cavity 230 of the housing 205. An activator 405 that is a motor can rotate the shaft 365 (e.g., a lead screw) in a first rotational direction or a second rotational direction. Moving the shaft 365 can include translating the drive body 325 through the cavity 230. The drive body 325 can move in a first translational direction and a second translational direction, based on the movement of the shaft 365. For example, an extension of the shaft 365 or rotation of the shaft 365 in the first rotational direction can translate the drive body 325 in the first translational direction. Retraction of the shaft 365 or rotation of the shaft 365 in the second rotational direction can translate the drive body 325 in the second translational direction.

Act 810 of moving an anchor can include moving anchor 305. Moving the anchor 305 can be based, at least partially, on the moving of the drive body 325. For example, translation of the drive body 325 can cause translation of the anchor 305. The anchor 305 can translate in the same direction as the drive body 325. Moving the anchor 305 can include moving anchor 305 between a first position and a second position. The first position can include disposing the pin 310 of the anchor 305 at a position closest to the first housing end 210 (e.g., at the first slot end 260). The second position can include disposing the pin 310 of the anchor 305 at a position closest to the second housing end 215 (e.g., at the second profile end 245). Moving the anchor 305 can include translating the anchor 305 via the shaft 365 and rotating the anchor via at least one of the spring 345 and the barrel cam profile 235.

Moving between the first position and the second position can include moving the anchor 305 from the first position to the second position. Moving from the first position to the second position can include translating the anchor 305 in a first translational direction (e.g., toward the second housing end 215). Translating of the anchor 305 can be caused by the shaft 365. Translating the anchor 305 in the first translational direction can include sliding the pin 310 along the slot 255 from the first slot end 260 to the second slot end 265. Sliding the pin 310 along the slot 255 can include preventing the anchor 305 from rotating while the pin 310 is disposed in the slot 255. For example, the slot 255 can extend along the housing 205 parallel with the longitudinal axis 250 such that sliding the pin 310 along the slot 255 can include moving the pin 310 in a translational direction parallel with the longitudinal axis 250. Moving the pin 310 in the translational direction can include moving the anchor 305 in the translational direction.

Moving from the first position to the second position can include rotating the anchor 305 in a first rotational direction. The anchor 305 can translate and rotate simultaneously with the pin 310 disposed along the barrel cam profile 235. Rotating the anchor 305 in the first rotational direction can be caused by the spring 345. For example, rotating the anchor 305 can include contacting a first spring arm 355 with a first contact surface (e.g., the anchor contact surface 315) and contacting a second spring arm 360 with a second contact surface (e.g., drive body contact surface 330). In a natural state, the spring 345 can have a first angle between the first spring arm 355 and the second spring arm 360. With the anchor 305 in the first position, the spring 345 can have a second angle between the first spring arm 355 and the second spring arm 360. The first angle can be different than the second angle. The second angle can cause the spring 345 to have a tension. Where the slot 255 begins to transition into the barrel cam profile 235, the tension in the spring 345 can rotate the anchor 305 via the anchor contact surface 315 such that the pin 310 slides along the barrel cam profile 235. Rotating the anchor 305 can reduce the tension in the spring 345.

The anchor 305 can continue to rotate as the pin 310 slides along the barrel cam profile 235 and as the shaft translates the anchor 305. The speed of the rotation can be based on a slope or shape of the barrel cam profile 235. For example, a steeper slope can correspond with a slower rotation. A more gradual slope can correspond with a faster rotation. The anchor 305 can continue to rotate as long as the barrel cam profile 235 has a shape that is not parallel with the longitudinal axis 250. The anchor 305 can translate and rotate until the anchor 305 reaches the second position. The second position can include the pin 310 being disposed at the second profile end 245 of the barrel cam profile 235.

Moving between the first position and the second position can include moving the anchor 305 from the second position to the first position. Moving from the second position to the first position can include translating the anchor 305 in a second translational direction (e.g., toward the first housing end 210). The second translational direction can be opposite the first translational direction. The translating of the anchor 305 can be caused by the shaft 365. Translating the anchor 305 in the second translational direction can include sliding the pin 310 along the barrel cam profile 235 from the second profile end 245 to the first profile end 240. Sliding the pin 310 along the barrel cam profile 235 can include rotating the anchor 305 via the barrel cam profile 235. For example, as the shaft 365 moves the anchor 305 toward the first housing end 210, the pin 310 can slide along the barrel cam profile 235 and make the anchor 305 rotate in a second rotational direction (e.g., opposite the first rotational direction). Rotating the anchor 305 in the second rotational direction can include increasing a tension of the spring 345. For example, rotating the anchor 305 in the second rotational direction can include moving the anchor contact surface 315 closer to the drive body contact surface 330 such that the angle between the first spring arm 355 and the second spring arm 360 reaches the second angle. Moving the anchor contact surface 315 closer to the drive body contact surface 330 can put the spring 345 in an unnatural state with an increased tension.

Moving from the second position to the first position can include preventing the anchor 305 from rotating when the pin 310 is disposed in the slot 255. For example, the pin 310 can reach the first profile end 240 of the barrel cam profile 235 and slide into the slot 255. The rotation of the anchor 305 can stop when the pin 310 is disposed in the slot 255. The anchor 305 can translate along the slot 255 until the anchor 305 reaches the first position. The first position can include the pin 310 being disposed at the first slot end 260 of the slot 255.

While the description herein describes moving the pin 310 of the anchor 305 along a slot 255 and a barrel cam profile 235, the actuator 200 can include no slot 255 such that the movement between the first position and the second position can include the pin 310 moving between the first profile end 240 and the second profile end 245.

While the description herein describes moving a single pin 310 of the anchor 305 along a slot 255 and a barrel cam profile 235, the actuator 200 can include an anchor 305 with a plurality of pins 310 that slide along a plurality of slots 255 and a plurality of barrel cam profiles 235. The plurality of barrel cam profiles 235 can have the same profile shape and the plurality of slots 255 can have the same shape such that the plurality of pins 310 can move along similar paths. For example, the housing 205 can include a first slot 255, a second slot 255, a first barrel cam profile 235 and a second barrel cam profile 235. The first barrel cam profile 235 can be disposed opposite the second barrel cam profile 235. The anchor 305 can have a first pin 310 and a second pin 310. Act 810 can include moving the first pin 310 along the first slot 255 and the first barrel cam profile 235 and moving the second pin 310 along the second slot 255 and the second barrel cam profile 235.

Figure 9:
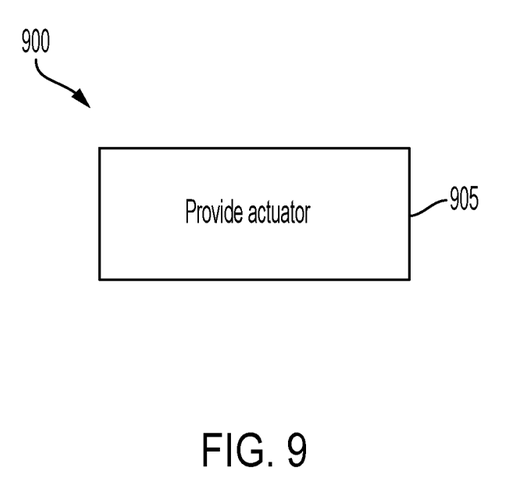
FIG. 9 depicts a flow diagram illustrating an example method to provide an apparatus, in accordance with some aspects.

FIG. 9 depicts an example method 900 to provide an actuator. Method 900 can include providing an actuator (Act 905). Act 905 can include providing actuator 200. Actuator 200 can include any combination of features described above. For example, the actuator 200 can include a housing 205. The housing 205 can define a cavity 230. The housing 205 can include a barrel cam profile 235. The barrel cam profile 235 can be a single-sided barrel cam profile 235. The actuator 200 can include an anchor 305. The anchor 305 can be at least partially disposed within the cavity 230. For example, a portion of the anchor 305 can extend through a second housing end 215 of the housing 205. The anchor 305 can move between a first position and a second position. Moving between the first position and the second position can include rotation and translation of the anchor 305 within the cavity 230. The actuator 200 can include a drive body 325. The drive body 325 can be disposed within the cavity 230. The drive body 325 can be coupled with the anchor 305. For example, the drive body 325 can be coupled with the anchor 305 such that the anchor 305 and the drive body 325 can translate together and the anchor 305 can rotate with respect to the drive body 325. The actuator 200 can include a spring 345. The spring 345 can be a torsion spring 345. The spring 345 can be at least partially disposed between the anchor 305 and the drive body 325. The spring 345 can include a first spring arm 355 to contact an anchor contact surface 315 and a second spring arm 360 to contact a drive body contact surface 330. The actuator 200 can include a shaft 365. The shaft 365 can interface with the drive body 325. The shaft 365 can translate the anchor 305 and at least one of the spring 345 and the barrel cam profile 235 can rotate the anchor 305 to move the anchor 305 between the first position and the second position. For example, the spring 345 can rotate the anchor 305 in a first rotational direction as the shaft 365 translates the anchor 305 in a first translational direction. The barrel cam profile 235 can rotate the anchor 305 in a second rotational direction (e.g., opposite the first rotational direction) as the shaft 365 translates the anchor 305 in a second translational direction (e.g., opposite the first translational direction).

Some of the description herein emphasizes the structural independence of the aspects of the system components or groupings of operations and responsibilities of these system components. Other groupings that execute similar overall operations are within the scope of the present application. The systems described above can provide multiple of any or each of those components and these components can be provided on either a standalone system or on multiple instantiations in a distributed system.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, references to the electric vehicle 105 can include internal combustion engine vehicles that can include the apparatus as described herein. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
    a housing defining a cavity, the housing comprising a slot and a barrel cam profile;
    an anchor comprising a pin, the anchor at least partially disposed within the cavity, the anchor to translate and rotate within the cavity to move between a first position and a second position, the slot to prevent the anchor from rotating the pin disposed in the slot;
    a drive body disposed within the cavity;
    a spring at least partially disposed between the anchor and the drive body; and
    a shaft to interface with the drive body, the shaft to translate the anchor;
    the spring or the barrel cam profile to rotate the anchor between the first position and the second position.

2. The apparatus of claim 1, comprising:
    the spring comprising a torsion spring, the torsion spring biases the anchor to the second position; and
    the barrel cam profile comprising a single sided barrel cam profile, the single sided barrel cam profile to rotate the anchor and increase a tension in the torsion spring as the shaft translates the anchor from the second position to the first position.

3. The apparatus of claim 1, comprising:
    the housing comprising a first slot, a second slot, a first single sided barrel cam profile, and a second single sided barrel cam profile, the barrel cam profile being the first single sided barrel cam profile;
    the first slot transitions into the first single sided barrel cam profile and the second slot transitions into the second single sided barrel cam profile;
    the first single sided barrel cam profile disposed opposite the second single sided barrel cam profile.

4. The apparatus of claim 1, comprising:
    the spring to rotate the anchor as the anchor moves from the first position to the second position; and
    the barrel cam profile to rotate the anchor as the anchor moves from the second position to the first position, the barrel cam profile being a single-sided barrel cam profile.

5. The apparatus of claim 1, comprising:
    the anchor comprising a pin;
    the housing comprising a slot, the slot comprising a first slot end and a second slot end; and
    the barrel cam profile comprising a first profile end and a second profile end, the second slot end transitions into the first profile end;
    the pin disposed at the first slot end with the anchor in the first position, the anchor to translate within the cavity as the pin moves along the slot between the first slot end and the second slot end, and the anchor to translate and rotate as the pin moves along the barrel cam profile between the first profile end and the second profile end.

6. The apparatus of claim 1, comprising:
the anchor defining an anchor cavity;
the spring defining a central aperture; and
the drive body comprising a boss that extends from the drive body, through the central aperture, and into the anchor cavity, the boss couples the drive body to the anchor such that the anchor translates with the drive body and the anchor rotates relative to the drive body.

7. The apparatus of claim 1, comprising:
the anchor defining an anchor cavity;
the drive body comprising a boss and a body aperture, the boss extends from the drive body into the anchor cavity and the body aperture extends through the drive body and the boss, at least a portion of the body aperture has a threaded profile; and
the shaft comprising a lead screw that extends through the body aperture and interacts with the threaded profile of the body aperture such that the drive body translates as the lead screw rotates.

8. The apparatus of claim 1, comprising:
the spring comprising a torsion spring, the torsion spring comprising a first spring arm and a second spring arm;
the anchor comprising a first contact surface to interface with the first spring arm;
the drive body comprising a second contact surface to interface with the second spring arm; and
the housing defining a longitudinal axis;
the anchor to rotate about the longitudinal axis in a first direction to move the first contact surface in the first direction and decrease a tension within the torsion spring, and the anchor to rotate about the longitudinal axis in a second direction to move the first contact surface in the second direction and increase the tension within the torsion spring, the first direction opposite the second direction.

9. The apparatus of claim 1, comprising:
an activator coupled to the shaft to move the anchor between the first position and the second position, the activator comprising at least one of a motor and a linear actuator.

10. The apparatus of claim 1, comprising:
an activator coupled to the shaft;
the anchor defining an anchor cavity; and
the housing comprising a first end and a second end;
the activator disposed at the first end of the housing;
the anchor to extend through the second end of the housing;
the drive body disposed between the activator and the anchor; and
the shaft extending from the activator, through the drive body, and into the anchor cavity.

11. A method, comprising:
activating an actuator, the actuator comprising:
a housing defining a cavity, the housing comprising a slot and a barrel cam profile;
an anchor at least partially disposed in the cavity, the anchor comprising a pin;
a drive body disposed in the cavity;
a spring disposed between the anchor and the drive body; and
a shaft that interfaces with the drive body;
moving the anchor from a first position to a second position, moving the anchor includes translating the anchor within the cavity via the shaft and rotating the anchor within the cavity via the spring or the barrel cam profile; and
preventing, by the slot, the anchor from rotating within the cavity with the pin disposed in the slot.

12. The method of claim 11, wherein:
the housing comprises a first slot, a second slot, a first barrel cam profile, and a second barrel cam profile, the barrel cam profile being the first barrel cam profile, the first barrel cam profile disposed opposite the second barrel cam profile; and
the anchor comprises a first pin and a second pin, the method comprising:
moving the first pin along the first slot and the first barrel cam profile; and
moving the second pin along the second slot and the second barrel cam profile.

13. The method of claim 11, comprising:
rotating the anchor via the spring as the anchor moves from the first position to the second position; and
rotating the anchor via the barrel cam profile as the anchor moves from the second position to the first position, the barrel cam profile being a single sided barrel cam profile.

14. The method of claim 11, wherein the spring is a torsion spring, comprising:
the torsion spring comprising a first spring arm and a second spring arm;
the anchor comprising a first contact surface; and
the drive body comprising a second contact surface, the method further comprising:
contacting the first spring arm with the first contact surface;
contacting the second spring arm with the second contact surface;
reducing a tension in the spring by moving the anchor from the first position to the second position; and
increasing the tension in the spring by moving the anchor from the second position to the first position.

15. The method of claim 11, wherein the shaft is a lead screw, the method comprising:
rotating the lead screw;
translating the drive body through the cavity along the lead screw based on the housing preventing the drive body from rotating;
translating the anchor based on the translating of the drive body; and
rotating the anchor via the spring or the barrel cam profile.

16. An electric vehicle, comprising:
an actuator coupled with a vehicle component, the actuator comprising:
a housing defining a cavity, the housing comprising a slot and a barrel cam profile;
an anchor comprising a pin, the anchor at least partially disposed within the cavity, the anchor to translate and rotate within the cavity to move between a first position and a second position, the slot to prevent the anchor from rotating with the pin disposed in the slot;
a drive body disposed within the cavity;
a spring at least partially disposed between the anchor and the drive body; and
a shaft to interface with the drive body, the shaft to translate the anchor;
the spring or the barrel cam profile to rotate the anchor as the anchor moves between the first position and the second position;
the actuator to move the vehicle component between a first component position and a second component position.

17. The electric vehicle of claim 16, wherein the vehicle component is a charge port door, the electric vehicle comprising:
- the housing comprising a slot that transitions into the barrel cam profile, a length of the slot based, at least partially, on a clearance needed for the charge port door to rotate between the first component position and the second component position.

18. The electric vehicle of claim 16, comprising:
- the anchor defining an anchor cavity;
- the spring defining a central aperture; and
- the drive body comprising a boss that extends from the drive body, through the central aperture, and into the anchor cavity, the boss to couple the drive body to the anchor.

* * * * *